Nov. 20, 1951  P. FARKAS  2,575,706
VEHICLE BRAKE

Filed Aug. 4, 1947  2 SHEETS—SHEET 1

Inventor
Pierre Farkas

Atty

Nov. 20, 1951  P. FARKAS  2,575,706
VEHICLE BRAKE
Filed Aug. 4, 1947  2 SHEETS—SHEET 2
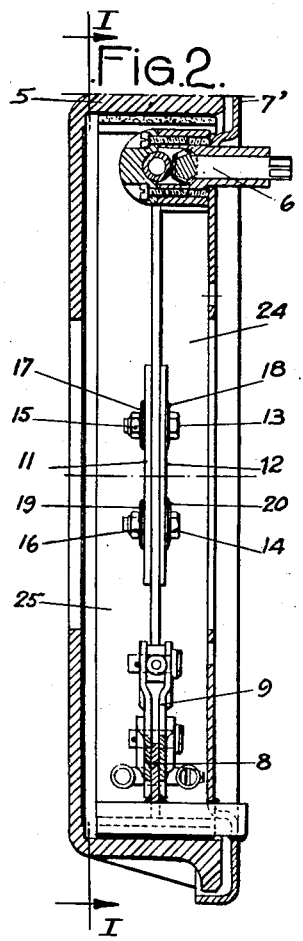
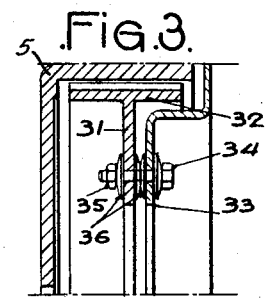
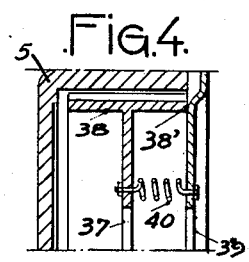
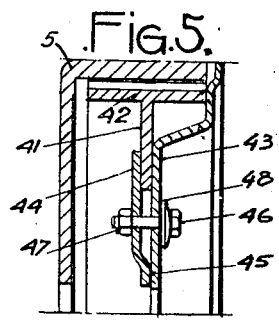
Inventor
Pierre Farkas
by J. Irwin
Atty.

Patented Nov. 20, 1951

2,575,706

UNITED STATES PATENT OFFICE 2,575,706

VEHICLE BRAKE

Pierre Farkas, Boulogne-sur-Seine, France

Application August 4, 1947, Serial No. 766,018
In France April 15, 1946

Section 1, Public Law 690, August 8, 1946
Patent expires April 15, 1966

16 Claims. (Cl. 188—78)

This invention relates to the brakes for vehicles and the like comprising drum-engaging shoes which are divided into segments that are interconnected by self-adapting devices for maintaining these segments in the relative positions in which they automatically adjust themselves when braking is effected. It appertains to so-called "self-applying or self-energizing brakes," as well as to any others.

According to the invention, the self-adapting devices comprise parts having shoulders gripping the under part of the rim of the shoe segments, approximately in the ultimate opening and closing positions of these shoes corresponding to their adjustment according to whether the linings are new or worn.

According to an embodiment, the self-adapting devices comprise small plates bolted to opposite sides of and connecting the ends of the webs of the shoe elements, these small plates having at their ends two shoulders gripping the under part of the rim of the shoe elements substantially beyond the maximum closing position of the latter and a projecting part in the center contacting the rims of these shoe elements substantially beyond their maximum opening position.

According to modifications, the shoe elements are maintained in their adjusted position by direct or indirect friction against the backing plate, by means of connecting or elastic braking components.

Further objects and advantages of my invention will be apparent from the description and claims.

In the drawings, in which embodiments of my invention are illustrated—

Figure 2 is a sectional view corresponding to line II—II of Figure 1.

Figure 1:
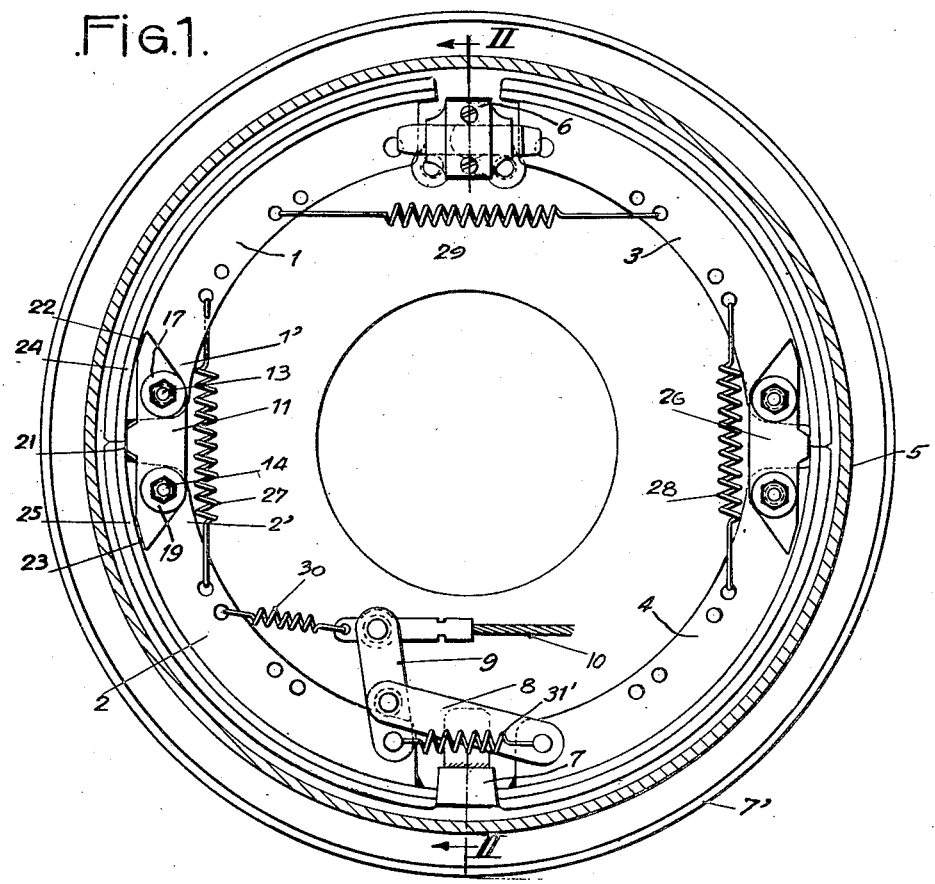
Figure 1 is a sectional view corresponding to line 1—1 of Fig. 2 and showing the shoes in elevation.

Figures 3, 4 and 5 are fragmentary sectional views similar to Fig. 2 and showing modifications wherein the shoe elements which are interconnected by the small shaping or self-adapting device plates are secured in their relative positions by direct or indirect friction against the brake backing plate by means of elastic connection between the web of the shoe elements and the said backing plates. The brake comprises two shoes each divided in two parts or segments 1, 2, 3, 4.

These shoes, set in the usual way, inside drum 5, are linked at one end on a regulating or adjusting device 6 and the other end freely engages a fixed abutment 7, which is part of or rigid with backing plate 7¹.

A floating toggle comprising a link 8 and a lever 9, is retracted by a spring 30 and operated by a cable 10, to bias the shoes apart and into braking engagement with the drums.

The other ends of shoe elements 1, 2, 3, 4 are connected by so-called self-adapting devices which frictionally engage and pivotally connect the adjacent ends of the webs of the segments of each shoe to permit articulation of the segments by engagement with the drum to apply uniform braking pressure and to retain the segments in this adjusted position between applications thereto.

The self-adapting device connecting the shoe elements 1 and 2 comprises two small plates 11, 12 placed across 1', 2' of the webs of the brake elements to which they are pivotally secured by bolts 13, 14 and nuts 15, 16. Elastic members, such as dished washers 17, 18, 19, 20, are mounted on the bolts 13, 14 on each side of the webs.

The small plates 11, 12 have three projecting parts 21, intermediately, and 22, 23 at the ends which extend toward the rims 24, 25 of the shoe elements 1, 2. When the lining of the shoe elements is new, there is a certain clearance between these three projecting parts and the rims of these shoe elements. However, the end projecting parts 22, 23 are quite near and contact the rims when the shoe elements 1, 2 are retracted. The intermediate projection 21 and the rims 24, 25 are normally spaced but the rims abut the projection when the shoe elements are excessively expanded in the braking operation. However, the gap between the projection 21 and the rims 24, 25 is calculated so that the rims do not abut the projection in operation until the linings are completely worn out. Thus, the three shoulders or projections 21, 22, 23 prevent excessive closing of the shoe elements when the linings are new, and also prevent excessive opening of the elements when the linings are worn out. This limiting of the relative motion of both shoe elements holds the latter in line one with the other and thus eliminates excessive deviations which would complicate assembly work.

Shoe elements 3, 4 are connected by a self-adapting device 26, similar to the one described for elements 1, 2. All of the shoe elements 1, 2, 3, 4 are respectively connected by return springs and compensating springs 27, 28, 29, 30, 31'.

The brake, in accordance with the invention is not limited to the foregoing embodiment, but contemplates any brake structure comprising shoes divided into elements and self-adapting devices fitted with projections or shoulders limiting the relative motions of these elements, and it can be incorporated in as a self-applying brake wherein the shoes push one another, or in the shape of a brake wherein the shoes, whether linked or bearing on a backing plate, work independently of each other. It is also obvious that, although the brake is shown as comprising two shoes each divided into two elements, it can also be incorporated in an arrangement of shoes each divided into or composed of a plurality of elements or segments of substantially equal lengths with links pivotally connected to and thus pivotally connecting the adjacent ends of the elements or segments as at the webs thereof, to permit articulation thereof, for instance, three shoes divided into two elements, two shoes each divided into three elements, and single or double (side by side) shoes divided into any required number. In some cases, the regulating device 6 can be replaced by a self-adapting device according to the invention.

In a brake incorporating self-adapting means according to the invention, other elastic or resilient components may be employed instead of the washers 17—20 on the self-adapting devices. For example, as shown in Figs. 3-5, elastic connections may be made between the webs of the shoe elements and the brake backing plate.

As shown in Figure 3, web 31 of the shoe element 32 is connected to brake backing plate 33 by a bolt 34 with nut 35 and elastic washers 36. Bolt 34 can move through a slot in backing plate 33. The brake comprises, for instance, as in Figure 1, four shoe segments or elements with self-adapting means such as 11, 26; only the resilient means 17—20 are replaced by devices such as illustrated in Figure 3.

In Figure 4, web 37 of shoe element 38 is connected to backing plate 39 by a tension spring 40 which permits the displacement of the shoe in relation to the backing plate but pulls the edge 38' of the shoe element into rubbing engagement against the backing plate to frictionally retain the shoe element in adjusted position.

In Figure 5, web 41 of shoe element 42 is sandwiched between backing plate 43 and a lug 44, fixed on to this backing plate as by welding 45 for example. The web 41 is elastically compressed between this lug 44 and backing plate 43 by a bolt 46 and nut 47 with an elastic washer 48 inserted between the bolt and one of the web clamping elements such as the backing plate.

Figure 1A:
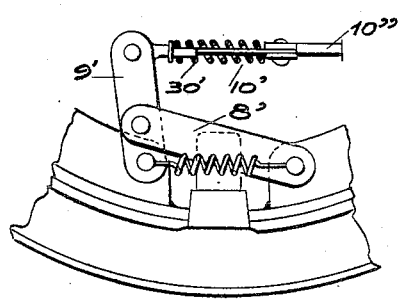
Figure 1a is a corresponding view of a modification.
Figure 1A:

In the modification shown in Figure 1a, cable 10' pulls on lever 9', connected to the link 8', as shown in Fig. 1. This cable is enclosed in a sleeve 10" and a return spring 30' is inserted between a shoulder of this sleeve and a shoulder on lever 9'.

It is possible, without going beyond the scope of the invention, to use other means for the shoe parts to have the same shape elastically by friction as in the position they assume when braking is applied.

Further modifications will be apparent to those skilled in the art and it is desired, therefore, that the invention be limited only by the prior art and the scope of the appended claims.

I claim:

1. A brake comprising a drum and a backing plate in relative rotatable relation, a pair of brake shoes anchored within said drum by said backing plate and including friction lining supporting rims having inwardly extending webs, adjustable means pivotally connected to one end of each of said brake shoes and expansible means connecting the other ends of said shoes, a fixed abutment between said latter ends and contacted thereby, said shoes being divided into a plurality of segments of substantially equal lengths, links pivotally connected to the adjacent ends of the webs of said segments to permit articulation of said segments, springs extending between the adjacent ends of said shoes and of said segments to retract said shoes from the drum, outward extensions on the ends of said links in close proximity to and for abutment with the shoe rims to limit retraction of said segments, and an outwardly extending lug centrally of each of said links in close proximity to and for abutment with the adjacent ends of the segments of said rims to limit expansion of said segments.

2. A brake comprising a drum and a backing plate in relative rotatable relation, a pair of brake shoes anchored within said drum by said backing plate and including friction lining supporting rims having inwardly extending webs, adjustable means pivotally connecting one end of said brake shoes and expansible means connecting the other end of said shoes, a fixed spacing member positioned between said latter ends and on which said ends bear, said shoes being equally divided into a plurality of segments, links parallel and pivotally connected to the adjacent ends of the webs of said segments, to permit articulation of said segments, springs extending between the adjacent ends of said shoes and of said segments to retract said shoes from the drum, extensions on the ends of said links outwardly of the pivots thereof closely adjacent but spaced from and for abutment with the inside of the segments of the shoe rims to limit retraction of said segments, an outwardly extending lug centrally of each of said links straddling the adjacent segment ends closely adjacent to and for abutment with the inner surfaces of the segments of said rims to limit expansion of said segments, and friction means between the links and segments resisting articulation of said segments.

3. A brake as defined in claim 2, wherein said friction means comprises spring washers on the pivots connecting the links and the segment webs.

4. A brake as defined in claim 2, wherein said friction means comprises studs extending through said webs and said backing plate, one of said latter elements being slotted to permit movement of said stud, and friction washers on said stud and engaging said webs and backing plate to resist relative movement therebetween.

5. A brake as defined in claim 2, wherein said friction means comprises lugs carried by said backing plate and clamping said webs therebetween, bolts extending through said lugs and backing plate for adjusting the tension on said webs, and spring washers on said bolts.

6. A brake comprising a drum and a backing plate in relative rotatable relation, a pair of brake shoes anchored within said drum by said backing plate and including friction lining supporting rims having inwardly extending webs, adjustable means pivotally connecting one end of said brake shoes and expansible means connecting the other end of said shoes, an abutment shoulder fixed to the backing plate and extending between the latter ends to retain them in spaced relation and freely contacted on opposite sides thereof by said ends, said shoes being divided into a plurality of segments, links pivotally connected to the adjacent ends of the webs of said segments to permit articulation of said segments, springs extending between the adjacent ends of said shoes and of said segments to retract said shoes from the drum, and friction means between said links and said segments free of the backing plate resisting articulation of said segments.

7. A brake as defined in claim 6, wherein said expansible means comprises a floating toggle consisting of a link pivoted to one of said latter ends, a lever pivoted to the other of said ends and pivoted between its ends to the link, a pulling cable connected to the free end of the lever to apply braking pressure on the shoes, and resiliently connected to the segment to which the lever is pivoted to normally release said pressure and shoes.

8. A brake comprising a drum and a backing plate in relative rotatable relation, a pair of brake shoes mounted on said backing plate within said drum and including friction lining supporting rims having inwardly extending webs, adjustable means pivotally connecting two adjacent ends of said shoes, normally contracted means pivotally connecting the other two adjacent ends of said shoes for expanding the same, a fixed abutment between said latter ends and holding them in spaced relation for bearing contact on opposite sides thereof, said shoes being each divided intermediately into a pair of segments, links on opposite sides of the complementary spaced web ends of said segments and pivotally connecting the same at diametrically opposite points normal to said means, with the corresponding ends of the rims of said segments adjacent each other to permit articulation of said segments, resilient means connecting the adjacent ends of the shoes and segments to retract the shoes from the drum, said links having outward extensions at their ends beyond the pivots disposed closely adjacent to but spaced from and for abutment with the shoe rims to limit retraction of said segments, and an outwardly extending lug centrally of each of said links straddling and disposed closely adjacent to but spaced from the adjacent ends of said pairs of segments for abutment with the adjacent ends of said rims alternately with the abutment of the extensions with the shoe rims, to limit expansion of said segments.

9. A brake as defined in claim 8, wherein said means are located diametrically opposite each other and said shoes are divided at diametrically opposite points normal to said means, and said expansion means is normally contracted.

10. A brake as defined in claim 8, wherein said abutment is fixed to the backing plate and extends inwardly of the shoe rims for free movement of the adjacent ends of the latter relative thereto.

11. A brake as defined in claim 8, wherein said shoes are divided into segments of substantially equal lengths, and friction means are provided between the links and segments independently of the backing plate, to resist articulation of said segments.

12. A brake as defined in claim 8, wherein said links are in the form of plates disposed parallel to each other and the webs, and friction means are provided for resisting articulation of said segments.

13. A brake as defined in claim 8, wherein friction means are provided for resisting articulation of said segments and comprise spring washers on the pivots connecting the links and segment webs.

14. A brake as defined in claim 8, wherein said lugs straddle the abutting ends of the rims of each pair of segments intermediately between said adjustable means and said expansible means, and friction means are provided to resist articulation of said segments and comprise studs extending through said webs and said backing plate, said backing plate being slotted to permit movement of said studs, and spring washers are provided on said studs in engagement with said webs and backing plate to resist relative movements therebetween.

15. A brake comprising a drum and a backing plate in relative rotatable relation, a pair of brake shoes mounted on said backing plate within said drum and including friction lining supporting rims having inwardly extending webs, adjustable means pivotally connecting two adjacent ends of said shoes, normally contracted means pivotally connecting the other two adjacent ends of said shoes for expanding the same, said shoes being each divided into a pair of segments of substantially equal lengths, links parallel to and against opposite sides of the webs of the adjacent ends of the pairs of segments, bolts through and pivotally connecting the links and adjacent spaced ends of the webs of said pairs of segments at diametrically opposite points normal to the location of both of said means with the adjacent ends of the segment rims abutting, to permit articulation of said segments, retractile means connecting the adjacent ends of the shoes and segments to retract the shoes from the drum, said links having tapered end extensions beyond the pivot bolts disposed in closely adjacent spaced relation to the rims of the segments for engagement therewith to limit retraction of said segments, and an outwardly extending central lug disposed in underlying closely adjacent spaced relation to the adjacent ends of said pairs of segments for engagement with the rim portions thereof to limit expansion of said segments, said extensions and lugs acting alternately, and friction means acting on opposite sides of the segment webs to resist articulation of the segments.

16. A brake as defined in claim 15, wherein said friction means comprises lugs fixed to said backing plate, said backing plate and lugs engaging on opposite sides of said webs, bolts extending through said backing plate and lugs for clamping said webs therebetween and adjusting the tension on said webs, and spring washers on said bolts.

PIERRE FARKAS.

REFERENCES CITED

The following references are of record in the file of this patent:

UNITED STATES PATENTS

| Number | Name | Date |
|---|---|---|
| 1,574,253 | Morgan | Feb. 23, 1926 |
| 1,712,855 | Thorne | May 14, 1929 |
| 1,757,348 | Van Buskirk | May 6, 1930 |
| 1,878,197 | Sneed | Sept. 20, 1932 |
| 1,908,410 | Dodge | May 9, 1933 |
| 1,994,434 | Parker et al. | Mar. 12, 1935 |
| 2,028,614 | LaBrie | Jan. 21, 1936 |
| 2,095,753 | LaBrie | Oct. 12, 1937 |
| 2,104,702 | Bowers et al. | Jan. 4, 1938 |
| 2,124,784 | LaBrie | July 26, 1938 |
| 2,211,439 | Schnell et al. | Aug. 13, 1940 |
| 2,259,266 | Rabe | Oct. 14, 1941 |

FOREIGN PATENTS

| Number | Country | Date |
|---|---|---|
| 242,853 | Great Britain | Nov. 19, 1925 |